United States Patent Office 2,905,564
Patented Sept. 22, 1959

2,905,564
NON-REACTIVE REFRACTORY

Rolland R. Roup and Roger L. Hitzeman, Milwaukee, Howard U. Taylor, Thiensville, and Clinton L. Beard, Milwaukee, Wis., assignors to Globe-Union Inc., Milwaukee, Wis., a corporation of Delaware No Drawing. Application July 24, 1957
Serial No. 673,762

2 Claims. (Cl. 106—57)

This invention relates to refractories.

An object of this invention is to provide a refractory material which is non-reactive with and particularly adapted for use in the firing of titania and alkaline earth titanate bodies.

Another object of this invention is to provide a refractory material which has good stability over an extended number of repeated uses, remains in good physical condition, resists tendency to warp in use and prevents warpage of the bodies supported thereon during firing of such bodies.

Still another object of this invention is to provide a refractory material which, in the preparation thereof, is fired at temperatures in the range of those used in subsequent service.

A further object of this invention is to provide a refractory material which may be easily and inexpensively formed into required shapes.

In general these objects are obtained by a refractory material composed basically of zirconium oxide with added amounts of calcium titanate (may be a mixture of the oxides of calcium and titanium or other compounds which on firing will form the oxides). The further addition of aluminum oxide is advantageous in adjusting shrinkage factors to particular situations. The addition of the calcium titanate lowers the initial firing temperatures, required to make such refractory members, to a range of 2300° F. to 2500° F. thus permitting such bodies to be fired at less expense, and makes the refractory member made therefrom have insignificant grain growth, retain physical condition, and show no effective warpage upon repeated use in the firing of bodies of titania and alkaline earth titanates.

The dilution of the zirconium oxide lessens the cost of the refractory material. However, a balance must be maintained between the amount of such dilution and the increase in reaction which takes place with the increase of the diluent. If the calcium oxide content is not in excess of approximately 1 to 1 mol ratio with the titanium dioxide, and the zirconium oxide content by weight does not become less than 20% of the total weight of the mixture, the refractory made therefrom will not react unfavorably with most bodies of titania and alkaline earth titanates being fired. It is desirable not to exceed 70 to 80% by weight of the zirconium oxide in order to limit growth on reheated uses and to obtain adequate strength when fired at temperatures up to 2500° F. Furthermore, to keep shrinkage within a practical range the addition of the calcium titanate should not exceed 70% by weight of the total weight of the mixture.

To illustrate the invention, blocks of refractories were made from the following compositions in the proportions by weight shown, compacted in accordance with the well-known practice, fired at from 2400° to 2500° F. and then examined for shrinkage, hardness and strength, and repeatedly used to support titania plates fired at under 2500° F. The blocks were examined to determine growth following such repeated uses and the plates analyzed to find the reaction of such blocks on such titania plates and also inspected for warpage:

| Composition No. | Percent by weight | | |
|---|---|---|---|
| | $ZrO_2$ | CaO | $TiO_2$ |
| 1 | 80 | 8.2 | 11.8 |
| 2 | 70 | 12.3 | 17.7 |
| 3 | 60 | 16.4 | 23.6 |
| 4 | 50 | 20.5 | 29.5 |
| 5 | 40 | 24.6 | 35.4 |
| 6 | 30 | 28.7 | 41.3 |
| 7 | 20 | 32.9 | 47.1 |

The tests of compositions 1 and 2 showed some growth on repeated cycles or firing and were somewhat softer and weaker. The tests of compositions 6 and 7 showed some additional shrinkage. However, all compositions were sufficiently non-reactive to the plates of titania and alkaline earth titanate materials to be entirely satisfactory for the purpose. The blocks made of compositions 1, 2, 6 and 7 can be used in applications where the growth and shrinkage characteristics are not a handicap.

These compositions may also be used as coating material on other refractory bases by pressing, spraying or brushing on these compositions on blocks of silicon carbide, zircon, mullite and other refractories normally reactive to the titania dielectric bodies. Such coating prevents the reaction from taking place.

It has been found that shrinkage characteristics can be readily adjusted to particular applications by adding aluminum oxide to such compositions. To illustrate this modification of the invention the following compositions were applied as coatings to silicon carbide blocks and the same tests made as set forth above:

| Composition No. | Percent by weight | | | |
|---|---|---|---|---|
| | $ZrO_2$ | CaO | $TiO_2$ | $Al_2O_3$ |
| 8 | 80 | 4.1 | 5.9 | 10 |
| 9 | 70 | 8.2 | 11.8 | 10 |
| 10 | 60 | 4.1 | 5.9 | 20 |
| 11 | 50 | 12.3 | 17.7 | 20 |
| 12 | 40 | 8.2 | 11.8 | 40 |
| 13 | 30 | 12.3 | 17.7 | 40 |
| 14 | 20 | 8.2 | 11.8 | 60 |

The tests of all these compositions showed that there was no harmful reaction and that shrinkage could be easily controlled. In all cases the calcium oxide and titanium dioxide may be added as calcium titanate. However, it is desirable to keep a 1 to 1 mol ratio between CaO and $TiO_2$.

The mixtures within the ranges described herein used either as supporting blocks or as coatings on other refractory bodies are non-reactive at normal firing temperatures to dielectric bodies made of titania or alkaline earth titanates such as barium, strontium, calcium, magnesium, and lead titanates, also including alkaline earth stannates, zirconates, and other modifying additives. These mixtures can be fired at lower temperatures (2300° F. to 2500° F.) as contrasted with 2700° F. and higher normally used for commercial stabilized zirconia refractories. Within the limits hereto expressed refractories made from these mixtures have negligible growth, remain in good physical condition, retain strength, hardness and sharp dimensional features, and resist warpage. The mixtures may be easily formed into desired shapes. Cost of preparation is lessened by the dilution of the zirconium oxide and lowered firing temperatures. No adverse warpage of the dielectric units fired on such refractories was found.

What we claim is:

1. A mixture for use in the manufacture of refractory material non-reactive to titania and alkaline earth titanate pieces in the firing thereof consisting essentially of the following in proportions by weight in the range:

| | Percent |
|---|---|
| $ZrO_2$ | 60 to 40 |
| CaO | 16.4 to 24.6 |
| $TiO_2$ | 23.6 to 35.4 |

2. A mixture for use in the manufacture of refractory material non-reactive to titania and alkaline earth titanate pieces in the firing thereof consisting essentially of the following in proportions by the weight in the range:

| | Percent |
|---|---|
| $ZrO_2$ | 60 to 40 |
| CaO | 4.1 to 12.3 |
| $TiO_2$ | 5.9 to 17.7 |
| $Al_2O_3$ | 20 to 40 |

References Cited in the file of this patent

UNITED STATES PATENTS

| | | |
|---|---|---|
| 2,483,794 | Wentworth | Oct. 4, 1949 |
| 2,678,887 | Hathaway | May 18, 1954 |